(12) United States Patent
Takahashi et al.

(10) Patent No.: US 8,366,545 B2
(45) Date of Patent: Feb. 5, 2013

(54) SCREEN OPERATION SYSTEM, SCREEN OPERATION METHOD, AND METHOD FOR PROVIDING NETWORK SERVICE

(75) Inventors: Hiroyuki Takahashi, Tokyo (JP); Shugo Takahashi, Tokyo (JP); Ayumu Shindo, Tokyo (JP)

(73) Assignee: Camelot Co., Ltd., Tokyo (JP)

( * ) Notice: Subject to any disclaimer, the term of this patent is extended or adjusted under 35 U.S.C. 154(b) by 503 days.

(21) Appl. No.: 12/529,570

(22) PCT Filed: Mar. 10, 2008

(86) PCT No.: PCT/JP2008/054315
§ 371 (c)(1),
(2), (4) Date: Sep. 2, 2009

(87) PCT Pub. No.: WO2008/108490
PCT Pub. Date: Sep. 12, 2008

(65) Prior Publication Data
US 2010/0130274 A1 May 27, 2010

(30) Foreign Application Priority Data
Mar. 8, 2007 (JP) .................................. 2007-059280

(51) Int. Cl.
*A63F 9/24* (2006.01)
*A63F 13/00* (2006.01)
(52) U.S. Cl. ................... 463/31; 463/7; 463/37; 463/42
(58) Field of Classification Search .................. None
See application file for complete search history.

(56) References Cited

U.S. PATENT DOCUMENTS

| 6,319,128 | B1 * | 11/2001 | Miyoshi et al. | 463/31 |
| 6,354,948 | B1 * | 3/2002 | Nagayama | 463/43 |
| 6,589,117 | B1 * | 7/2003 | Moritome et al. | 463/37 |
| 7,582,010 | B2 * | 9/2009 | Takahashi et al. | 463/3 |

(Continued)

FOREIGN PATENT DOCUMENTS

| JP | 3046047 U | 2/1998 |
| JP | 2000-308756 A | 11/2000 |

(Continued)

OTHER PUBLICATIONS

Reel Fishing III Instruction Manual, Natsume Serious Fun, released 2003 for Playstation 2; pp. 1-15.*

(Continued)

*Primary Examiner* — David L Lewis
*Assistant Examiner* — Shauna-Kay Hall
(74) *Attorney, Agent, or Firm* — Maier & Maier PLLC (57) ABSTRACT

Provided is a screen operation method for operating a character in a virtually 3-dimensional space displayed on a 2-dimensional screen. The method includes: inputting a movement command for an object by an input device; displaying on a movement amount display unit, a change of an object movement amount in accordance with the movement command; displaying accumulated effect by the object movement on an accumulated effect display unit; and executing the next event process in the virtually 3-dimensional space by an event generation unit when the accumulated effect has reached a predetermined value. Thus, it is possible to provide GUI exhibiting higher reality in an operation of a simulation game and the like and provide a new business of an online game in which a virtual game world is linked with a real service.

14 Claims, 8 Drawing Sheets

U.S. PATENT DOCUMENTS

| | | | |
|---|---|---|---|
| 2001/0007826 A1* | 7/2001 | Suzuki | 463/16 |
| 2003/0104868 A1* | 6/2003 | Okita et al. | 463/42 |
| 2006/0189393 A1* | 8/2006 | Edery | 463/58 |
| 2007/0066394 A1* | 3/2007 | Ikeda et al. | 463/37 |
| 2007/0238523 A1* | 10/2007 | Kim | 463/40 |

FOREIGN PATENT DOCUMENTS

| | | |
|---|---|---|
| JP | 2002-45575 A | 2/2002 |
| JP | 2002-66144 A | 3/2002 |
| JP | 2002-224438 A | 8/2002 |
| JP | 2002-259815 A | 9/2002 |
| JP | 2003-103056 A | 4/2003 |
| JP | 2004-41645 A | 2/2004 |
| JP | 2004-65839 A | 3/2004 |
| JP | 2004-133815 A | 4/2004 |
| WO | 2006/070741 A1 | 7/2006 |

OTHER PUBLICATIONS

Tsu, Shukan Fami, "Wii no Subete Oshiemasu", 12 Gatsu 15 Nichi Go, Dec. 15, 2006, vol. 21, No. 50, whole No. 939, pp. 125-129.

International Search Report dated May 27, 2008 to corresponding international application No. PCT/JP2008/054315, 4 pages.

* cited by examiner

SCREEN OPERATION SYSTEM, SCREEN OPERATION METHOD, AND METHOD FOR PROVIDING NETWORK SERVICE

RELATED APPLICATIONS

The present invention claims priority under 35 U.S.C. §119 to Japanese Patent Application No. 2007-059280, filed on Mar. 8, 2007, the disclosure of which is incorporated by reference herein in its entirety.

FIELD OF THE INVENTION

The present invention relates to a screen operation system, a screen operation method and a method for providing network services through GUI (Graphical User Interface) for television games, computer games and the like.

BACKGROUND ART

Conventionally, television games have been developed in a variety of ways, for example, as systems provided as home video game dedicated machines, coin-operated arcade game machines and the like, and in the form of game software which can be run by a general-purpose computer such as a personal computer. On the other hand, game programs provided through a communication network such as the Internet have become popular as distributed by the so-called online gaming services, which are taking the place of the conventional distribution through recording mediums such as CD-ROM.

For example, as one category of the games, there are sports simulation games such as a fishing game. In this sports simulation game, a player inputs several conditional parameters required for pulling up fish on the basis of the user operation. These conditional parameters are input through a GUI displayed in a screen with an input interface such as a controller of the game device, a mouse or the like.

Meanwhile, in the case of sports simulation games, a variety of GUIs have been developed and proposed. For example, the above various conditional parameters (data) such as input timings are changed in accordance with the skill of the player in order to make the game more exciting. Some controllers of game devices are provided with vibration functionality through which it is possible to give the user feeling or a sense of damage which the character to be controlled would experience in the virtual space of the game.

However, in the case of a terminal such as a personal computer which is not provided with the vibration functionality, there is visual implementation provided for representing the feeling the character would experience by the use of various indicators which are displayed in the screen. Particularly, for enhancing the entertainment of the simulation game such as a fishing game, it is important how to give the player the feeling that the character would experience, and how to express the reality of operation performed in response thereto.

For example, the technique disclosed in Patent Document 1 makes it possible for the player to perform click operation in response to which the character swings a fishing rod as casting motion in the screen, and adjust the casting distance (the length of a fishing line: line meter) while viewing a power gauge indicative of the force of casting. Then, when fish appears, an underwater window is opened in the game screen to display the fish together with a pointing button which is used to catch fish with a hook. This underwater window is designed to know the positional relationship between a bait and the fish, and the fish can be caught by pressing the pointing button at the moment that the fish bites the bait.

Next, the caught fish is pulled up. A tension gauge and a spinning button are displayed in the game screen. The fish (item) can be successfully landed and gotten when the winding button is operated to adjust the tension within a predetermined range of the tension gauge. As has been discussed above, in accordance with the GUI described in Patent Document 1, the game system can be set up such that fish goes away when the pointing timing fails or when the tension goes out of the predetermined range of the tension gauge during the winding operation.

However, there is a problem in that the relationship between the angler (character) and fish in the water is visually represented in the underwater window as the scene which can not be viewed in real fishing, and thereby the reality is compromised in fact. On the other hand, if no representation is provided of the relationship between the character and fish, there is a problem in that the feeling that the character would experience cannot be given to the player so that the game becomes less interesting.

Furthermore, since the game world is a virtual world, the scenario of game is completed as a scenario in the screen. Nevertheless, it is possible in an online game system to manage the result of game for each user, and provide continuing services in accordance with the result of game, and thereby a new business is expected with cooperation between a virtual game world and real services.

[PATENT DOCUMENT 1] Japanese Patent Published Application No. 2004-133815

DISCLOSURE OF INVENTION

Taking into consideration the above circumstances, it is an object of the present invention to provide a screen operation system and a screen operation method with higher realism in the operation of a simulation game or the like, and provide a method for providing network services which enables a new business of an online game in which a virtual game world is linked with a real service.

In order to accomplish the object as described above, the present invention provides a screen operation system for operating an object in a virtual space displayed in a two-dimensional screen, comprises: an input unit operable to input a movement instruction to the object; a movement amount display unit operable to display the variation in the movement amount of the object in response to the movement instruction; an accumulated effect display unit operable to display accumulated effect in accordance with the movement of the object; and an event generation unit operable to invoke a next event process in the virtual space when the accumulated effect has reached a predetermined value.

In the invention as described above, it is preferred that the object is a character playing fishing, that the movement instruction is an instruction to perform an operation of winding a fishing line, and the variation in the movement amount is the tension of the fishing line generated by the winding operation, that the accumulated effect is the length of the fishing line which is wound by the winding operation performed by the character; and that the event process is to perform the operation of pulling up fish by the character and the image processing required thereof.

In accordance with the present invention as described above, since the instantaneous movement amount and the accumulated effect thereof can be displayed together, the user can easily image the operation of a sports simulation game such as a fishing game or a paraglider game in a realistic manner. For example, when a fishing line is wound in a fishing game, the instantaneous movement amount and the accumulated effect thereof can be displayed respectively as the tension applied to the fishing line and the length of the fishing line which is wound (i.e., the distance between the angler and fish).

Also, in the case where a mouse is clicked as the input unit described above, for example, the operation of depressing a button may be regarded as the instantaneous movement amount, and the effect may be accumulated during maintaining the depressed condition. When the button is released, the motion of the character is halted (for example, releasing the tension applied to the fishing line) as well as the accumulation of effect, so that the user can image the motion and feeling of the character in a more realistic manner.

In the invention as described above, the screen operation system may further comprises an application server which is located on a communication network constructed by connecting communication lines with each other, and operable to run a program to construct and display the virtual space, and provide a service through the virtual space; a client terminal connected with the application server to communicate with through the communication network, and provided with an input unit and a display unit for displaying the virtual space; and a management server which is connected to the application server, identifies the user who operates the client terminal, and manages the user and the event process invoked by the user operation in association with each other, wherein when the event process is invoked, the application server instructs the management server to start a predetermined service for the user who is associated with this event process, and wherein the management server performs management of the predetermined service for the user in response to the instruction to start the predetermined service.

The event of the above invention may be conducted as the process of selecting and managing a parcel in accordance with the species and number of a virtual fish the character pulled up. In this case, for example, it is possible to provide the service that an event in the virtual world is realized by performing the procedure of delivering to the user a real fish which is the same (or similar) fish as virtually caught by the user in the game world.

In the invention as described above, it is preferred that the management server stores the history of operations of each character performed by each user, the history of invoking the event process, and the history of providing the predetermined service, and is provided with an information delivery function for providing these histories such that these histories can be reviewed through the communication network. In this case, a server on a network can be used to store as histories the fact of playing the game, the results of playing the game, the service received in accordance with the results and so forth, and therefore the histories can be reviewed with a personal computer, a cellular phone or the like by accessing the network.

In the invention as described above, it is preferred that when each history is reviewed, the information delivery function displays a virtual image taken in the virtual space in association with the each history. In this case, like commemorative pictures, the image of the game screen is included in the history information, and therefore virtual events in the game world are recorded with a sense of realism.

Meanwhile, in the invention as described above, it is preferred that the input device is a controller which can be manipulated by the user in hand, and this controller is equipped with a built-in sensor capable of measuring the variation in the angle of inclination and the variation in the acceleration.

BEST MODE FOR CARRYING OUT THE INVENTION (Configuration of 3D Game Device)

Figure 1:
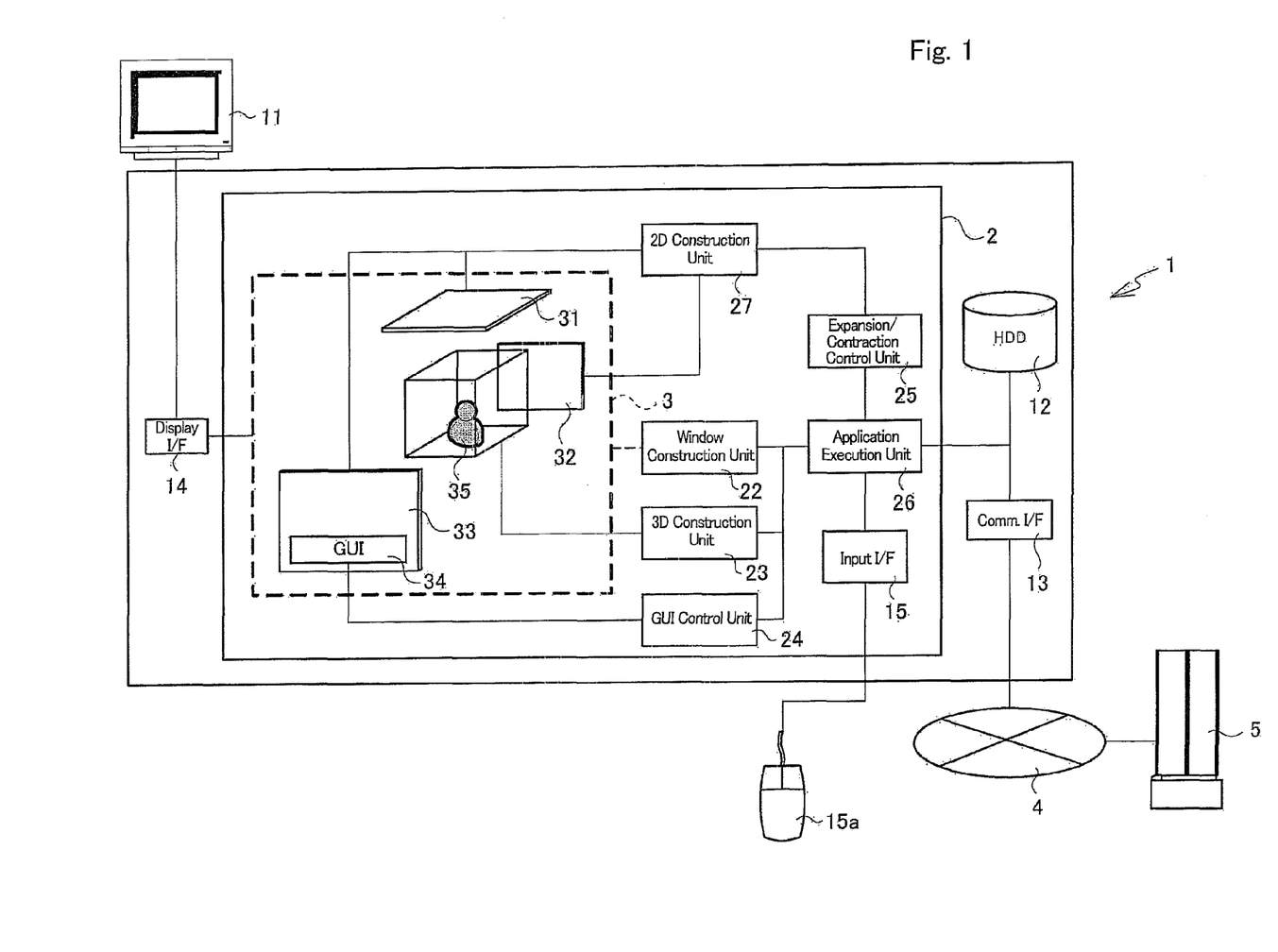
FIG. 1 is a block diagram which shows the configuration of a 3D game device provided with a screen operation system in accordance with an embodiment.

An embodiment of the present invention will be explained with reference to the accompanying drawings. FIG. 1 is a block diagram which shows the configuration of the 3D game device provided with a screen operation system in accordance with the present embodiment. Incidentally, the example of the present embodiment is described in the case where fishing game software is run on a user terminal 1.

Also, while the present invention is applied to the fishing game software in the case of the present embodiment, the present invention is not limited thereto, but also applied to, for example, flight simulation games such as a hang glider game, hopping sports games and any other game software which proceeds with the game by inputting operations to objects such as a player displayed on a screen.

The 3D game apparatus in accordance with the present embodiment is implemented with the user terminal 1 in which fishing game software is run. More specifically speaking, this user terminal 1 comprises a CPU 2 for performing arithmetic operations, a storage device 12 such as a hard disk for storing data and programs, a communication interface (I/F) 13 for accessing a communication network 4 such as the Internet, a display interface (I/F) 14 for connecting a display device such as a display 11, and an input interface (I/F) 15 for connecting input devices 15a such as a mouse, a keyboard and a controller.

Incidentally, the user terminal 1 of the present embodiment is capable of accessing a game server 5 through the communication network 4, and communicating with the game devices used by other users through this game server 5 such that a number of users can participate in the same game through the game server 5.

In other words, when playing the online game through this communication network 4, the respective entry players share the information of the entry players (the properties of characters to be used, the properties of items such as fishing rods and bait, or other information necessary for playing the game) and the information necessary for demonstration as delivered to the terminals of the respective entry players through the game server 5.

On the other hand, the information on the 3D shapes of sees and rivers, the design of each character, texture and so forth relating to the presentation of a virtual space is installed in the terminal of each user in advance. The processes of three-dimensional and two-dimensional images are performed on the user terminal sides, such that the conditions of the respective players and the progress of the game are synchronized and reflected in each user terminal on a real time base.

Incidentally, during playing the game, while providing enhanced demonstration, making the scene alive and enabling the entry players to deliver and share information as talking theiramong at certain intervals, the information is shared in a simple manner during inputting a casting condition, and the input condition after finishing the input operation is completely shared through the game server 5.

A variety of modules are built by driving the CPU 2 to run a fishing game software. In the context of this document, the term "module" is intended to encompass any function unit capable of performing necessary operation, as implemented with hardware such as a device or an apparatus, software capable of performing the functionality of the hardware, or any combination thereof.

More specifically described, the CPU 2 runs the fishing game software to build a window control unit 22, a 3D configuration unit 23, a GUI control unit 24, an expansion/contraction control unit 25, an application execution unit 26 and a 2D configuration unit 27.

The application execution unit 26 is a module for running the fishing game software to proceed with the fishing game by making use of objects which are arranged in a 3D virtual space 3. More specifically speaking, the application execution unit 26 performs the progress management of the game in accordance with the rules of fishing (the appearance probability of fish, the endurance of a fishing line to the tension thereof, the necessary roll length and so forth), the event process management in accordance with the progress of the game, and the arithmetic operation necessary for fishing simulation in the virtual space by calculating the casting condition (for throwing the fishing line) of user operation on the basis of the ability parameters of the character and the properties of items such as fishing rod and bait.

Incidentally, while a virtual 3D space 3 is constructed as a three-dimensional representation to make alive the scene and the like in the case of this fishing game program, since the display device the user views is two-dimensional, the interface is provided for helping the user to spatially recognize the space by automatically performing the camera work which is moved in the vertical plane along the shooting direction, representing this plane in association with a power gauge, and so forth.

Then, the fishing game program receives the user operation through the input interface 15, proceeds with the game in accordance with the condition (operation data) acquired in response to the user operation, generates display information items (3D polygons and so forth), displays the windows 31 to 33 as two-dimensional planes, and outputs sound associated with the display.

The window control unit 22 is a module for controlling the windows 31 to 33 displayed in the screen. Specifically speaking, while virtual cameras are provided for setting the field-of-view ranges in the virtual 3D space 3, the objects imaged by the virtual cameras are displayed in the windows 31 to 33 respectively as two-dimensional planes. Meanwhile, in the case of the present embodiment, the window 33 is a main window showing the motion of a character in a background. The main window includes the GUI 34. Also, the window 32 is a jump window in which a view is imaged from another angle, and the window 31 is a top window in which a full view is imaged as a bird's-eye view.

The 3D configuration unit 23 is a module for virtually constructing the 3D space, and controlling the position coordinates of the objects located in the three-dimensional coordinate system in this virtual 3D space 3. The 2D configuration unit 27 is a module for two-dimensionally displaying the virtual 3D space 3 in the windows 31 to 33 in accordance with the field-of-view range of each of the windows 31 to 33 on the basis of the type, area and shape of each window. The expansion/contraction control unit 25 is a module for changing the areas and shapes of the windows 31 to 33 on the basis of the operation through the input device 15a.

The GUI control unit 24 is a module for controlling the graphic user interface (GUI) 34 which is located in the windows 31 to 33 (mainly in the main window 33 in the case of the present embodiment) for displaying information about the game and enabling the user to perform operation. In the case of the present embodiment, the fishing game proceeds in response to the operation of an object displayed in the display 11 through the GUI 34 by the use of the input device 15a.

Figure 2:
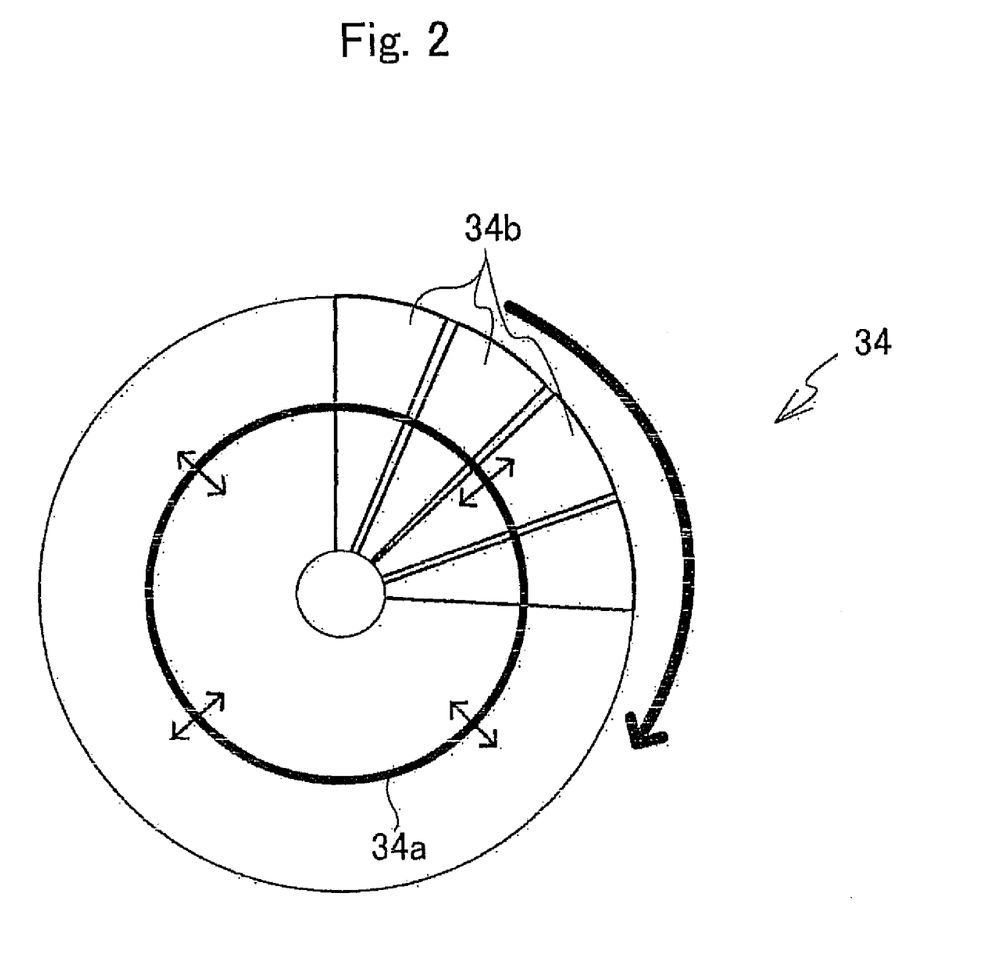
FIG. 2 is a configuration view for schematically showing a GUI 34 in accordance with the embodiment.

The GUI 34 comprises gauge-type graphics mainly displayed in the main window 33, as illustrated in FIG. 2, i.e., a movement amount display unit 34a which indicates the change in the movement amount of an object in response to the user operation, an accumulated effect display unit 34b which indicates the accumulated effect in accordance with the movement of the object.

Figure 3:
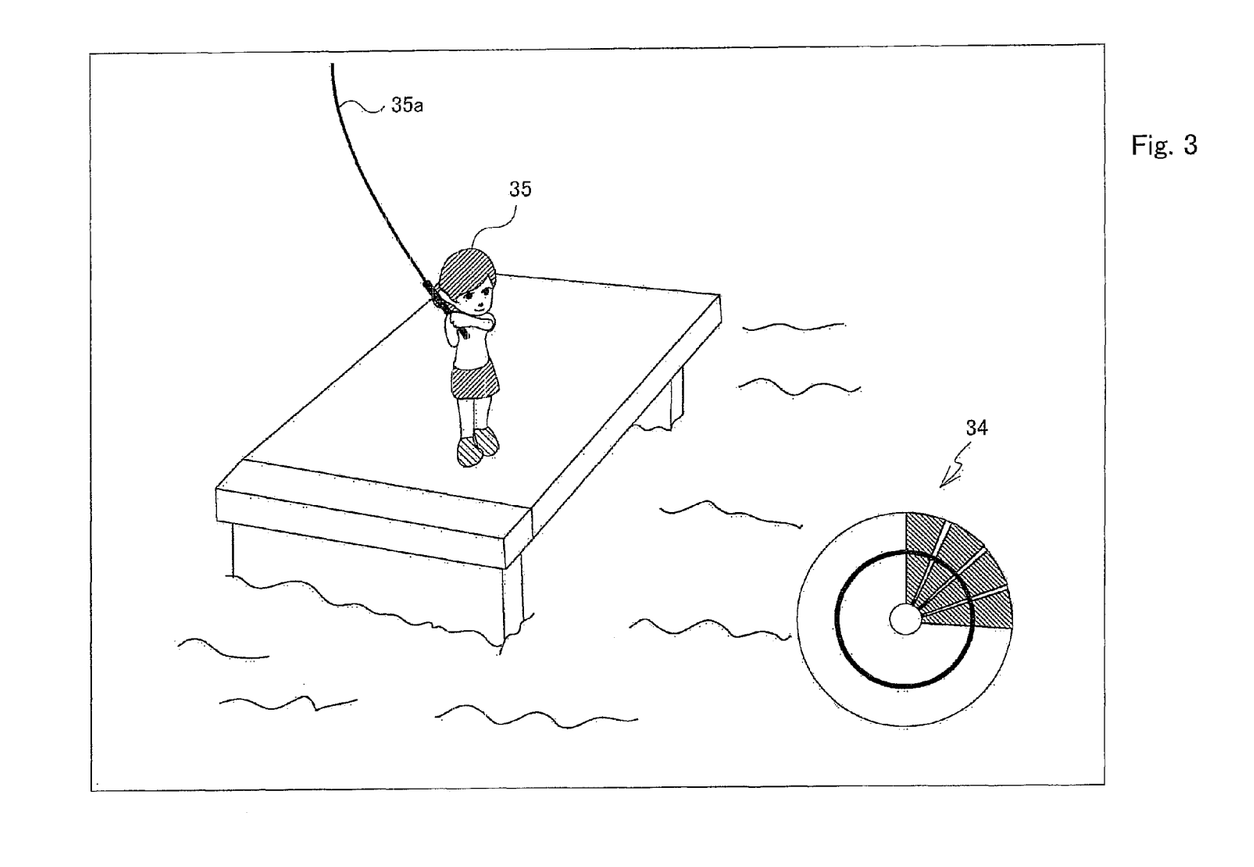
FIG. 3 is a screen configuration view of the fishing game in accordance with the embodiment.

More specifically speaking, in the case of the present embodiment, the object is a character 35 as an angler shown in FIG. 3, and the aforementioned movement command is a command for winding a fishing line. Also, the change in the movement amount corresponds to the tension of the fishing line generated by the winding operation. Then, while the fishing line is wound up by continuing giving the fishing line a tension, the winding length corresponds to the moving distance of fish which becomes a trigger to generate an event as accumulated effect.

The configuration of the GUI 34 in accordance with the present embodiment is designed such that the magnitude of the tension of the fishing line is represented by the diameter of the movement amount display unit 34a in the form of a circle, and that the winding length of the fishing line (the distance to a fish character) is represented by the increment/decrement number of an arc-shaped gauge. Then, when the winding length of the fishing line (accumulated effect) reaches a predetermined value, the process proceeds to the next event process, i.g., the operation and image process required of the character for pulling up the fish.

When casting action is performed to start fishing, at first, the character swings the fishing rod in response to an operation for starting the casting action (for example, clicking a mouse), and then the fishing line is thrown. The appearance frequency of each fish is determined in accordance with the casting position of this casting action, a bait type and the properties of the character, and the fish is caught by the fishing line in accordance with the probability corresponding to the frequency.

Figure 4:
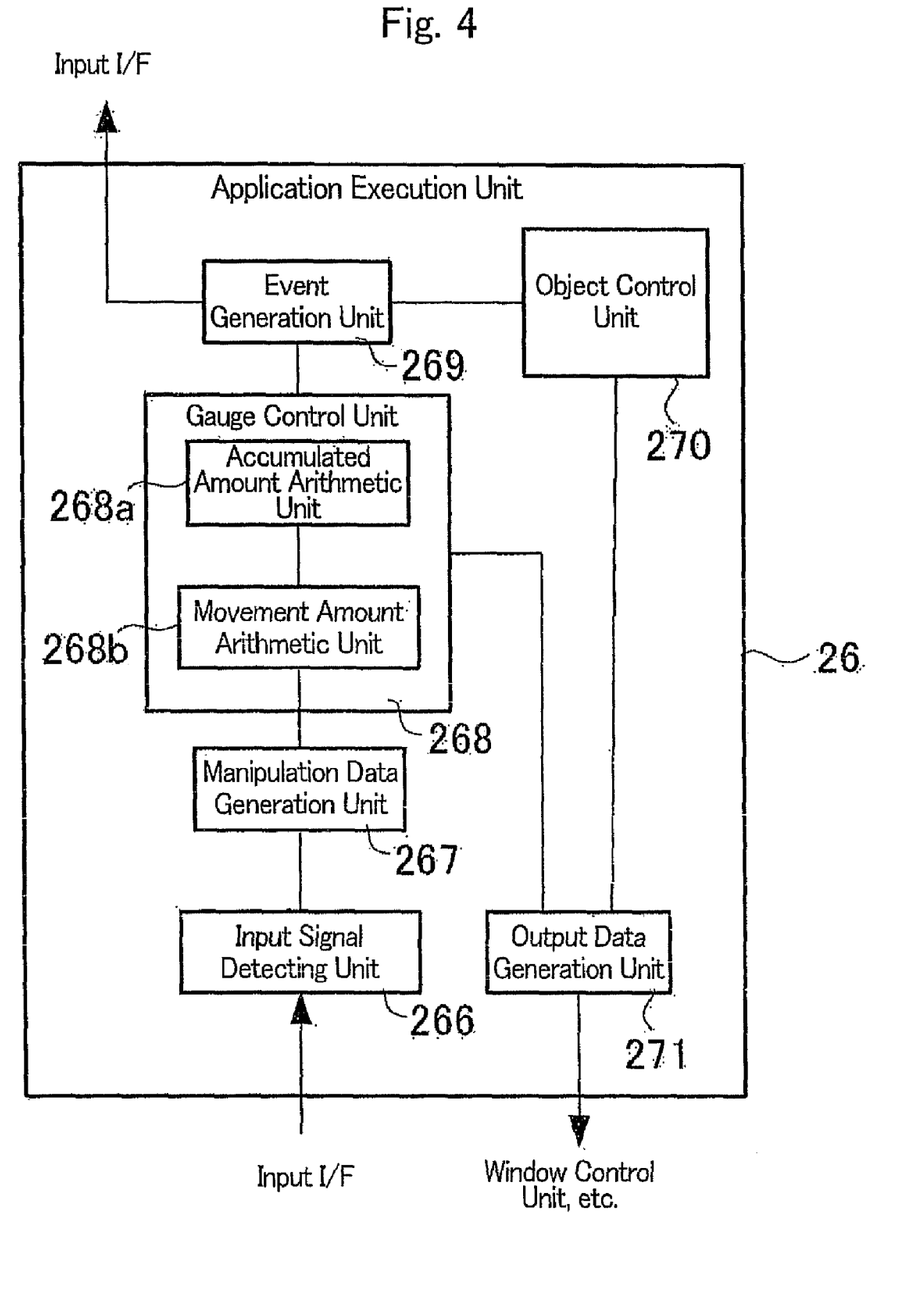
FIG. 4 is a block diagram for showing the configuration of a manipulation signal input system in an application execution unit 26 in accordance with the embodiment.

Thereafter, the application execution unit 26 performs the arithmetic processing for operation required when the fish is caught, and the game proceeds in accordance with the winding operation of the fishing line. FIG. 4 is a block diagram for showing the configuration of a manipulation signal input system in the application execution unit 26.

Namely, the application execution unit 26 is provided with an input signal detecting unit 266 and a manipulation data generation unit 267 for generating manipulation data in accordance with the input signal, as a module for acquiring the operation signal input through the input device 15*a*.

The application execution unit 26 is provided further with a gauge control unit 268, an event generation unit 269 and an object control unit 270, as a module for controlling objects in accordance with the generated manipulation data.

The gauge control unit 268 is a module for performing graphic control such as switching the display type of the GUI 34 and performing arithmetic operation of the manipulation signal input through this GUI 34, and provided with an accumulated amount arithmetic unit 268*a* for calculating the accumulated amount and a movement amount arithmetic unit 268*b* for calculating the movement amount.

The movement amount arithmetic unit 268*b* serves to calculate the magnitude of the tension which is caused just when depressing a mouse button, and as long as the mouse button is being depressed, the winding operation of fish is continued on the basis of the relationship between the tension and the resistance ability of the fish. When the mouse button is released from the depressed state, the tension of the fishing line is also released, and the winding operation is halted so that the winding length becomes zero or negative. Meanwhile, it is determined on the basis of the species of the fish (the remaining resistance ability) whether the winding length is zero or negative during halting.

The accumulated amount arithmetic unit 268*a* serves to calculate the winding length per unit time in accordance with the tension and the resistance ability of the fish, and calculate the winding length as the product of the time and the winding length per unit time as calculated. The data calculated in the gauge control unit 268 is input to the event generation unit 269 and an output data generation unit 271.

The event generation unit 269 is a module for monitoring the value of the data input from the gauge control unit 268, and outputting a trigger signal indicative of event generation to the object control unit 270 when the data input value exceeds a predetermined threshold, followed by transmitting this trigger signal to the game server 5 through a communication interface 13.

The object control unit 270 constructs a 3D animation for pulling up a fish in response to the event which is generated, and performs necessary processes for constructing 3D images on the basis of the manipulation signal which is obtained and arithmetically processed by the gauge control unit 268, followed by outputting signals to outside modules through the output data generation unit 271. The 2D configuration unit 27 generates a two-dimensional image to be two-dimensionally displayed in each window on the basis of the signals, followed by displaying the two-dimensional image on the display 11 through the display interface 14.

The game server 5 is a server unit, which is located on the communication network formed by connecting communication lines to each other, as an application server for providing services through the virtual space by running a program which constructs and displays the virtual space in which the fishing game can be played, and as a management server for identifying the user who operates the user terminal 1 and managing the user and the event process invoked by the user operation in association with each other.

Then, when the event process is invoked, the game server 5 starts a predetermined service associated with the event process for the user, and performs the management of the predetermined service in association with that user in response to the instruction to start the service. In particular, the game server 5 delivers an on-line game to the user terminal 1 by the application server function, and performs identity verification of the user who plays the on-line game to charge a service fee by the management server function.

Figure 5:
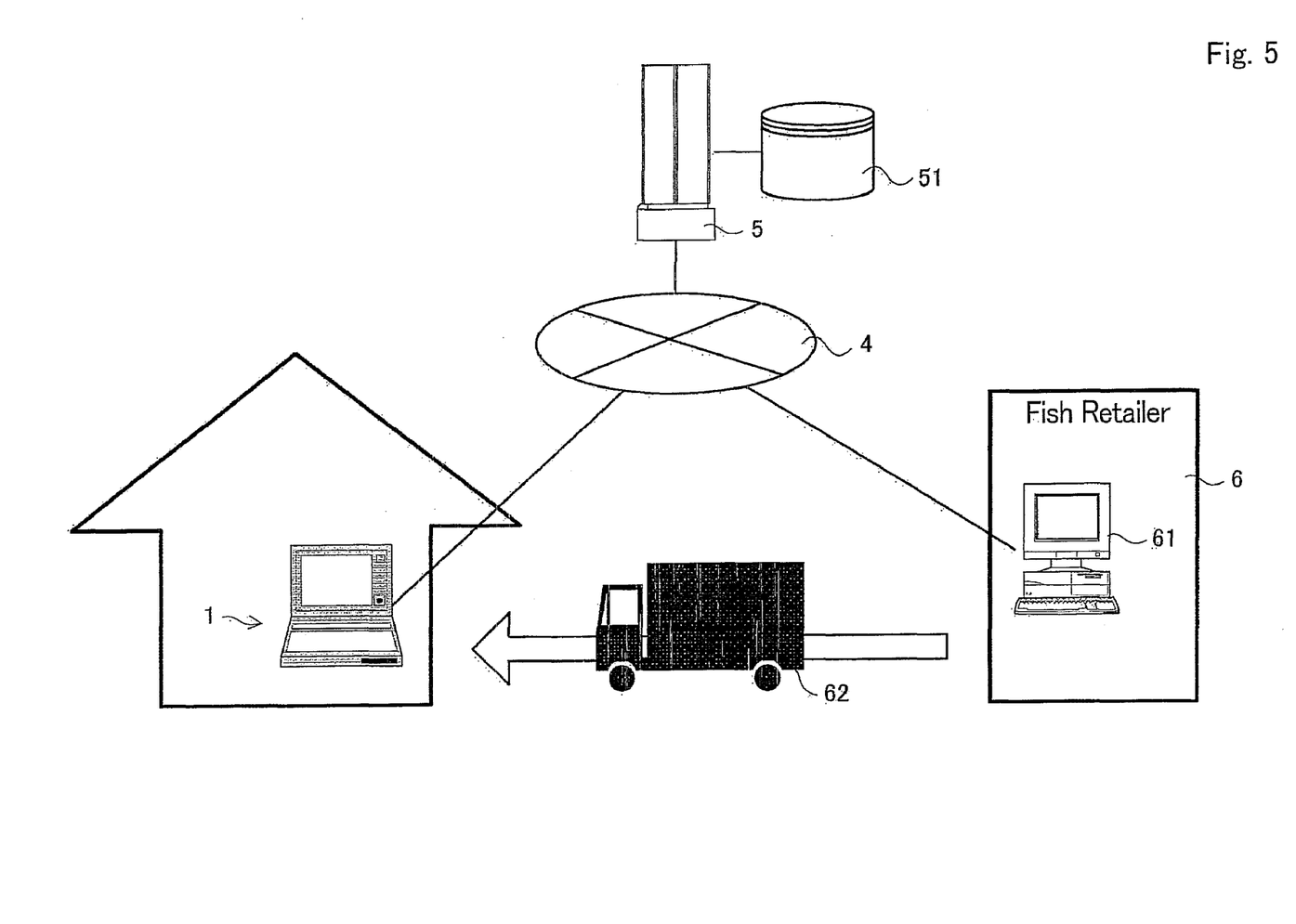
FIG. 5 is an explanatory view for schematically showing a network service in accordance with the embodiment.

Also, when the event process is invoked at the user terminal 1, the game server 5 selects a parcel in accordance with the species and number of virtual fishes the character pulled up, and manages the data relating thereto. More specifically speaking, as illustrated in FIG. 5, when the user pulled up a fish to generate an event at the user terminal 1, the game server 5 acquires the species and number of fishes the character pulled up at the user terminal 1.

The game server 5 selects fish in accordance with the species and number of fishes as acquired, connects with a terminal 61 of a fish retailer 6 to notify the selected data, and asks the fish retailer 6 to arrange delivery to the residence of the user who is identified. The fish retailer 6 then ships the requested fish to the user's home. Meanwhile, in this example, the species of fish to be caught is determined at the user terminal 1. However, the present invention is not limited thereto. For example, by storing and managing the species and number of fish which can be delivered at the game server 5 or the terminal 61 of the fish retailer 6, the event generation unit 269 of the user terminal adjusts the appearance probabilities of the fishes which can be caught.

On the other hand, the management server function of the game server 5 is capable of storing the history of operations of each character performed by each user, the history of invoking the event process, and the history of providing the predetermined service, and provided with an information delivery function of for providing these histories such that these histories can be reviewed through the communication network. When each history is reviewed, a virtual image taken in the virtual space can be displayed by the information delivery function in association with the each history.

Figure 6:
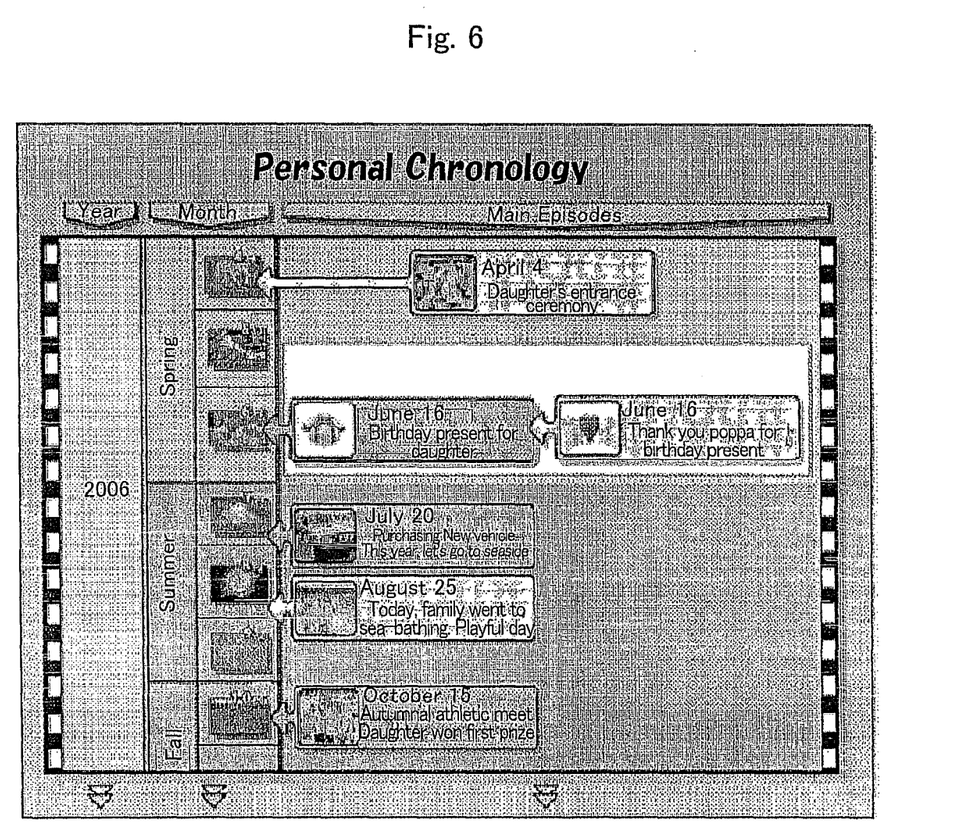
FIG. 6 is a screen configuration view of the "personal chronology" in accordance with the embodiment.
Figure 7:
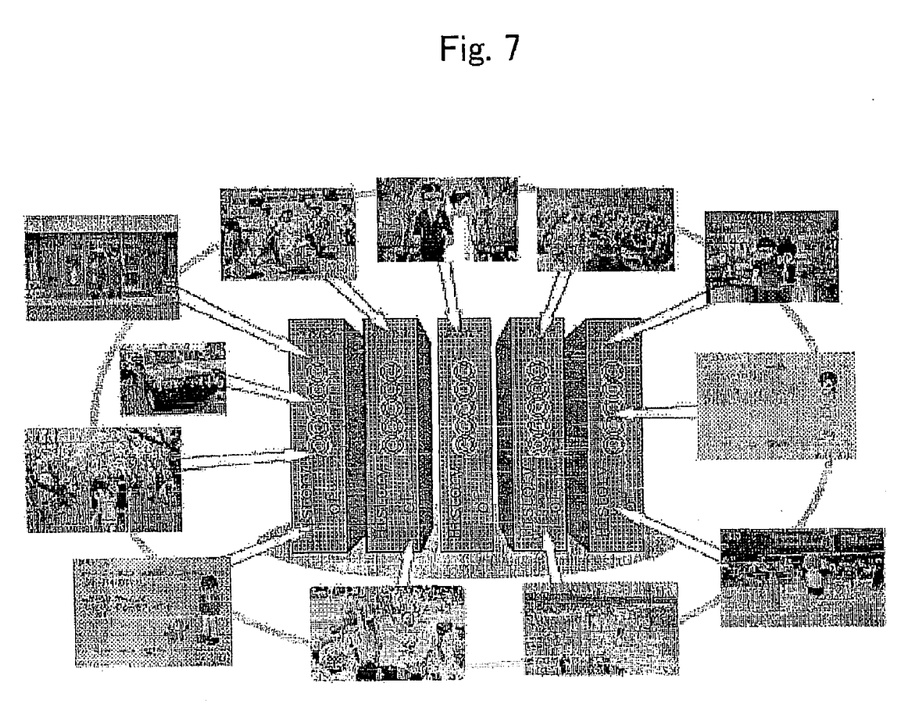
FIG. 7 is an explanatory view for schematically showing a service relating to the "personal chronology" in accordance with the embodiment.

More specifically speaking, as illustrated in FIG. 6 and FIG. 7, history information called "personal chronology" is generated in the game server 5. This "personal chronology" is used to store the history of various Internet services provided through the game server 5, for example, blog or diary, net auction, shopping, upload of images and other history together with written text data and image data. The result of the online game as described above can be stored as part of the history information together with the image data of the game screen. Then, the history information can be classified and edited on the basis of various keywords and properties (time and date, data type, user name and the like), such that various types of albums can be reviewed as the personal chronology.

(Method of Providing Network Services)

Figure 8:
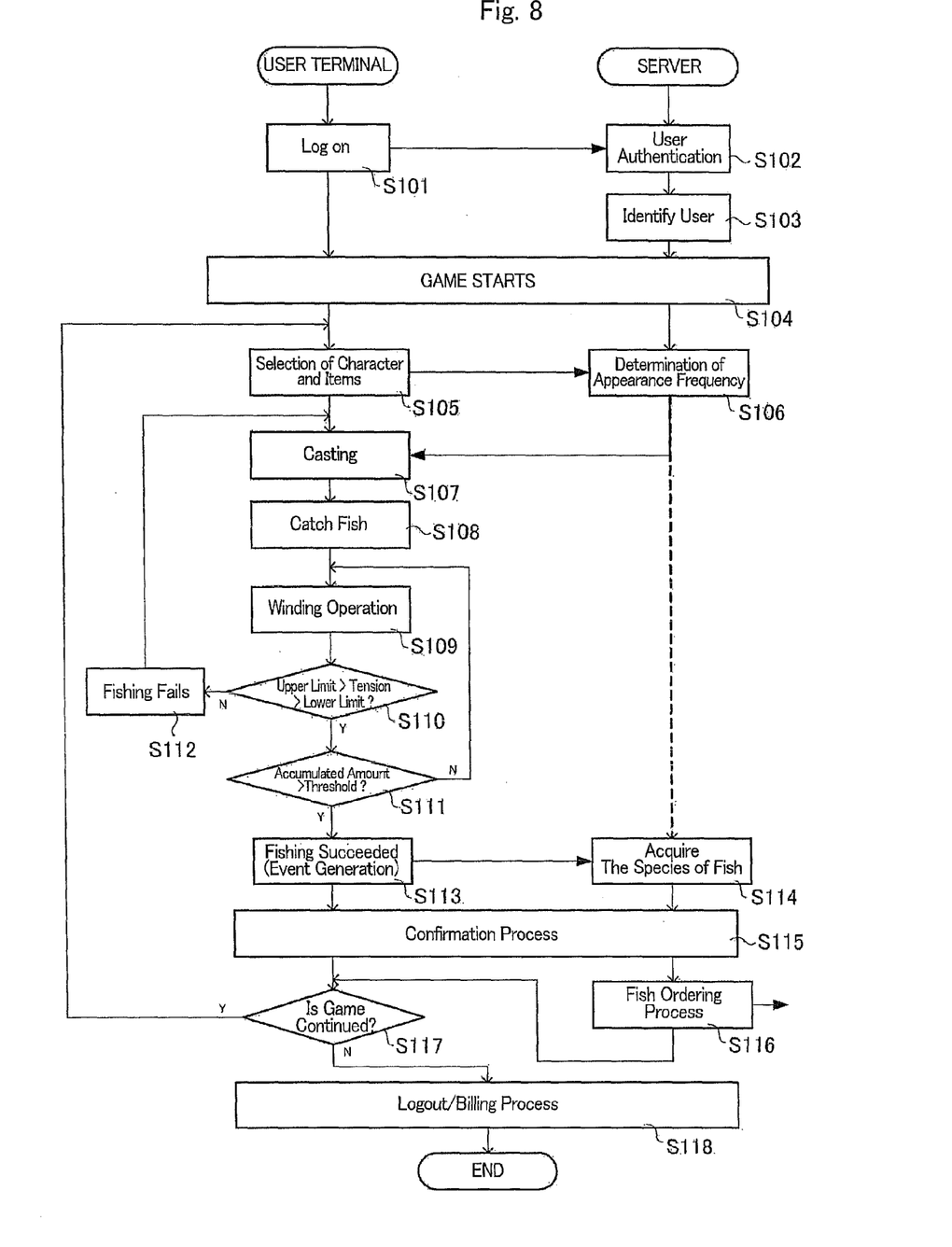
FIG. 8 is a flow chart for showing the steps of the method of providing network services in accordance with the embodiment.

The method of providing network services in accordance with the present invention can be implemented by operating the 3D game device having the structure as described above. FIG. 8 is a flow chart for showing the steps of the method of providing network services in accordance with the present embodiment.

First, the user terminal is connected to the communication network 4 for accessing the game server 5. After accessing, user authentication is performed as a login process (S101 and S102). For example, after an ID and a password are input, the user is recognized as a registered user and permitted to pass the login process in step S103 when the user can be identified by referring to the user database 51.

If the user authentication is successfully completed, the game server 5 starts the online game (S104). In this case, the game server 5 transmits various data required for proceeding with the game. The execution of the game program is performed at the user terminal 1.

After starting the game, user operation is performed at the user terminal 1 in order to select the character as an angler, the fishing rod, bait and so forth used by the character in step S105. The game server 5 acquires the setting data corresponding to the selection operation, and this setting data is used to determine the species of fish and the probability that each fish appears (appearance frequency) in step S106, followed by transmitting the data to the user terminal 1.

The user operates the manipulation device of the user terminal 1 to perform casting in step S107. The probability that each fish appears is varied in accordance with the position in which the casting is performed (i.e., the location where bait falls).

Next, the game program makes fish be caught in accordance with the probability in step S108. The user starts the winding operation when fish is caught in step S109. The winding operation is continued during the mouse button is depressed and maintained in the depressed state in which the character performs the action of winding the fishing line to which tension is applied. As this tension increases, the diameter of the movement amount display unit 34a increases. The fishing line is wound up when a certain tension is applied, and the distance between the fish and the character decreases. The accumulated effect display unit 34b extends in proportion to the decrease in the distance. On the other hand, when the mouse button is released, the winding operation is halted to release the fishing line. The diameter of the movement amount display unit 34a decreases while the tension decreases.

Meanwhile, the fishing line is would up when the button is depressed in this example. However, the present invention is not limited thereto. For example, tension is applied just after the button is depressed to shorten the distance to the fish for a moment, and the tension is released just after the button is released such that the fishing line is wound up when the tension is released. In the same manner as in the actual fishing action, there may be a time lag between the tension or winding length of the fishing line and the distance to the fish being pulled. Furthermore, in this case, the action of winding the fishing line can be synchronized with the rotating operation of a scroll wheel of a mouse such that, while adjusting the force applied to the fishing rod by button manipulation, the operation of winding the fishing line is controlled by manipulating the scroll wheel.

Also, the input device used by the user may be, for example, a controller which can be manipulated by the user in hand. This controller may be equipped with a built-in sensor capable of measuring the variation in the angle of inclination and the variation in the acceleration. In accordance with such a controller, a manipulation signal can be generated by moving up the controller in hand or swinging the controller in hand in correspondence with the action of lifting or casting the fishing rod, and the character may perform the action of winding the fishing line in the screen in accordance with this manipulation signal. This kind of controllers may have various configuration, for example, in the form of a cellular phone equipped with a built-in acceleration sensor, a handheld gaming device equipped with a built-in acceleration sensor, a game ROM equipped with a built-in acceleration sensor, and so forth.

The event generation unit 269 monitor the movement amount and the accumulated movement amount during the winding operation by this character. The winding operation is continued as long as the tension is lower than a predetermined threshold value, and the accumulated movement amount is within a predetermined range (no higher than an upper threshold value and no lower than a lower threshold value). When the tension comes out of the predetermined range (i.e., the "Yes" branch from step S110), e.g., when the fishing line is excessively pulled or released, the fish comes off from the fishing hook such that the fishing fails in step S112. Meanwhile, in this decision step S110, the differential value from the threshold range (the upper limit and the lower limit) and the time in which the tension is out of the predetermined range are measured and taken into consideration to determine success or failure. For example, the game system can be set up such that, even with the same tension, fishing line breakage is determined in accordance with whether the tension is applied instantaneously or continuously, and that fish goes away if the fishing line is left loose in a predetermined time or longer.

Then, when the fishing line is wound up by a predetermined length or longer without a tension exceeding the threshold (i.e., the "Yes" branch from step S111), it is recognized that the fishing succeeded, and an event is generated in step S113.

In response to this event as generated, the object control unit 270 outputs an animation of pulling up the fish by the character, and the event generation unit 269 notifies the generation of the event to the game server 5 in step S114.

The game server 5 stores the species of the caught fish and the user having pulled the fish in association with each other in the user database. At this time, the event generation unit 269 transmits an image of the character in the moment that the fish is pulled up to the game server 5, and the game server 5 stores the image in the "personal chronology" as the history of the game service.

Also, the game server 5 asks the user to confirm for starting the delivery of the fish the user has caught in response to the above event as generated in step S115. The confirmation is made to determine whether or not the user wishes to receive the service of delivering the fish, to what location the fish is to be delivered if he wishes, and so forth. Then, after the user's confirmation, the game server 5 performs the procedure of ordering and delivering the fish from the fish retailer 6 in step S116. The fish retailer 6 delivers the ordered fish to the user's home in response to the request.

On the other hand, at the user terminal 1, it is requested to determine whether or not the game is continued. If continued (i.e., the "Yes" branch from step S117), the above steps S105 to S115 are repeated. Conversely, if quitting the game (i.e., the "No" branch from step S117), a logout process is performed, and the game server 5 performs the billing process relating to the on-line game provision service.

(Modification Example)

The screen operation system as described above is explained with an example of fishing game. The present invention is not limited thereto, but applicable for example to flight simulation games such as a hang glider game in which the lift force and the altitude or flight distance correspond respectively to the movement amount and the accumulated movement amount, a hopping sports game in which the elastic force and the height correspond respectively to the movement amount and the accumulated movement amount, and any other game in which the object of the game can be achieved in relation to the movement amount and the accumulated movement amount.

More specifically speaking, for example, the present invention is applicable to a boating game in which the force applied to oars and the speed (travel distance) of the boat correspond respectively to the movement amount and the accumulated effect, a balloon maneuver game in which the injection quantity of a burner and the up and down movement of a hot-air balloon correspond respectively to the movement amount and the accumulated effect. Also, the present invention is applicable to a music instrument playing game in which, while the movement amount is represented by the player blowing into a wind instrument or the rhythm of hitting a percussion instrument, the accumulated effect is represented by the success rate of music performance.

Furthermore, the event generated as a result of accumulating effects is not limited to that described in the aforementioned embodiment, but a variety types of events can be employed instead.

For example, in a game of questing for a virtual item by continuous actions, such as a mushroom-picking game, a treasure hunter game and the like game, an event can be generated as delivery of real goods, when the item is got as a result of accumulating effects. In the case of such a mushroom-picking game or a treasure hunter game, the movement amount may be represented by the motion of the character itself, for example, walking around and digging in the ground, and the operation of rearing an animal such as a pig or a dog or getting an apparatus such as a mine detector. Also, in this case, the accumulated effect may be represented by the growth of the animal or the accuracy (perfection level) of the apparatus, and the player can discover an item in accordance with the degree of growth/accuracy.

Furthermore, also in the case of the fishing game itself, the present invention is not limited to the aforementioned embodiment. For example, a bottle containing a map indicating treasure may be caught by the fishing in place of fish, followed by treasure hunting in a virtual world. This map can be a map indicating a shop in the real world so that more customers are expected in the brick-and-mortar shop.

INDUSTRIAL APPLICABILITY

As has been discussed above, in accordance with the present invention, it is possible to provide a GUI having higher realism in the operation of a simulation game or the like, and provide an on-line game enabling a new business of an online game in which a virtual game world is linked with a real service, for example, by delivering real fish to the user' home as virtual fish which has been caught by the user in the game.

What is claimed is:

1. A screen operation system for operating an object in a virtual space displayed in a two-dimensional screen, comprising:
    an input unit operable to input a movement instruction to the object;
    a movement amount display unit operable to display a variation in the movement amount of the object in response to the movement instruction;
    an accumulated effect display unit operable to display accumulated effect in accordance with the movement of the object; and
    an event generation unit operable to invoke a next event process in the virtual space when the accumulated effect has reached a predetermined value,
    wherein the input unit is provided with a button for clicking,
    the operation of depressing the button is regarded as an instantaneous movement amount, and the effect is accumulated during maintaining the depressed condition,
    when the button is released from the depressed state, the variation in the movement amount is released and the accumulation of effect is halted;
    wherein the variation in the movement amount is represented by the diameter of a circle; and
    wherein the accumulation of effect is represented by the increment/decrement number of an arc-shaped gauge on the circle.

2. The screen operation system as claimed in claim 1 wherein the object is a character playing fishing,
    wherein the movement instruction is an instruction to perform an operation of winding a fishing line, and the variation in the movement amount is the tension of the fishing line generated by the winding operation,
    wherein the accumulated effect is the length of the fishing line which is wound by the winding operation performed by the character; and
    wherein the next event process is to perform the operation of pulling up fish by the character and the image processing required thereof.

3. The screen operation system as claimed in claim 1 further comprising:
    an application server which is located on a communication network constructed by connecting communication lines with each other, and operable to run a program to construct and display the virtual space, and provide a service through the virtual space;
    a client terminal connected to the application server to communicate with the communication network, and provided with an input unit and a display unit for displaying the virtual space; and
    a management server which is connected to the application server, identifies a user who operates the client terminal, and manages the user and the next event process invoked by the user operation in association with each other,
    wherein when the next event process is invoked, the application server instructs the management server to start a predetermined service for the user who is associated with this event process, and
    wherein the management server performs management of the predetermined service for the user in response to the application server's instruction to start the predetermined service.

4. The screen operation system as claimed in claim 3 wherein the object is a character which is operated at a user terminal and plays fishing,
    wherein the movement instruction is an instruction to performs an operation of winding a fishing line, and the variation in the movement amount is the tension of the fishing line generated by the winding operation,
    wherein the accumulated effect is the length of the fishing line which is wound by the winding operation performed by the character,
    wherein the next event process is to perform the operation of pulling up fish by the character and the image processing required thereof, and
    wherein the application server and the management server select and manage a parcel in accordance with the species and number of a virtual fish the character pulled up.

5. The screen operation system as claimed in claim 3 wherein the management server stores a history of operations of each character performed by each user, a history of invoking the next event process, and a history of providing the predetermined service, and is provided with an information delivery function for providing these histories such that these histories can be reviewed through the communication network.

6. The screen operation system as claimed in claim 5 wherein when each history is reviewed, the information delivery function displays a virtual image taken in the virtual space in association with the each history.

7. The screen operation system as claimed in claim 1 wherein the input unit is a controller which can be manipulated by a user in hand, and this controller is equipped with a built-in sensor capable of measuring the variation in the angle of inclination and the variation in the acceleration.

8. A screen operation method for operating an object in a virtual space displayed in a two-dimensional screen, comprising:

inputting a movement instruction to the object by an input unit;

displaying a variation in the movement amount of the object on a movement amount display unit in response to the movement instruction;

displaying an accumulated effect in accordance with the movement of the object on an accumulated effect display unit; and invoking a next event process by an event generation unit in the virtual space when the accumulated effect has reached a predetermined value, wherein the input unit is provided with a button for clicking, the operation of depressing the button is regarded as an instantaneous movement amount, and the effect is accumulated during maintaining the depressed condition, and when the button is released from the depressed state, the variation in the movement amount is released and the accumulation of effect is halted;

wherein the variation in the movement amount is represented by the diameter of a circle; and wherein the accumulation of effect is represented by the increment/decrement number of an arc-shaped gauge on the circle.

9. The screen operation method as claimed in claim 8 wherein the object is a character playing fishing, wherein the movement instruction is an instruction to perform an operation of winding a fishing line, and the variation in the movement amount is the tension of the fishing line generated by the winding operation, wherein the accumulated effect is the length of the fishing line which is wound by the winding operation performed by the character; and wherein the invoking next event process is to perform the operation of pulling up fish by the character and the image processing required thereof.

10. A method of providing a network service wherein there are provided in advance on a communication network constructed by connecting communication lines with each other, an application server operable to run a program to construct and display a virtual space, and provide a service through the virtual space; and a management server which is connected to the application server, identifies a user who operates a client terminal, and manages the user and a next event process invoked by the user operation in association with each other, wherein the client terminal connected to the application server to communicate with the application server through the communication network, and provided with an input unit and a display unit for displaying the virtual space, performs:

inputting a movement instruction to the object by the input unit;

displaying a variation in the movement amount of the object on a movement amount display unit in response to the movement instruction; and displaying accumulated effect in accordance with the movement of the object on an accumulated effect display unit, wherein the input unit is provided with a button for clicking, the operation of depressing the button is regarded as an instantaneous movement amount, and the effect is accumulated during maintaining the depressed condition, and when the button is released from the depressed state, the variation in the movement amount is released and the accumulation of effect is halted, wherein the variation in the movement amount is represented by the diameter of a circle, wherein the accumulation of effect is represented by the increment/decrement number of an arc-shaped gauge on the circle, wherein the application server performs invoking a next event process in the virtual space when the accumulated effect has reached a predetermined value at the client terminal, and wherein when the next event process invoked in the application server instructs the management server to start a predetermined service for the user who is associated with this event process, and the management server performs management of the predetermined service for the user in response to the instruction to start the predetermined service.

11. The method of providing a network service as claimed in claim 10 wherein the object is a character which is operated at a user terminal and plays fishing;

the movement instruction is an instruction to perform an operation of winding a fishing line, and the variation in the movement amount is the tension of the fishing line generated by the winding operation, wherein the accumulated effect is the length of the fishing line which is wound by the winding operation performed by the character, wherein the next event process is to perform the operation of pulling up fish by the character and the image processing required thereof; and wherein the application server and the management server select and manage a parcel in accordance with the species and number of a virtual fish the character pulled up.

12. The method of providing a network service as claimed in claim 10 wherein the management server stores a history of operations of each character performed by each user, a history of invoking the next event process, and a history of providing the predetermined service, and is provided with an information delivery function for providing these histories such that these histories can be reviewed through the communication network.

13. The method of providing a network service as claimed in claim 12 wherein when each history is reviewed, the information delivery function displays a virtual image taken in the virtual space in association with the each history.

14. The screen operation method as claimed in claim 8 wherein the input unit is a controller which can be manipulated by the user in hand, and this controller is equipped with a built-in sensor capable of measuring the variation in the angle of inclination and the variation in the acceleration.

* * * * *